May 6, 1958   W. T. CORSETTE   2,833,568
SWIVEL PIPE FITTING WITH BEARING RETAINER
Filed Feb. 8, 1954
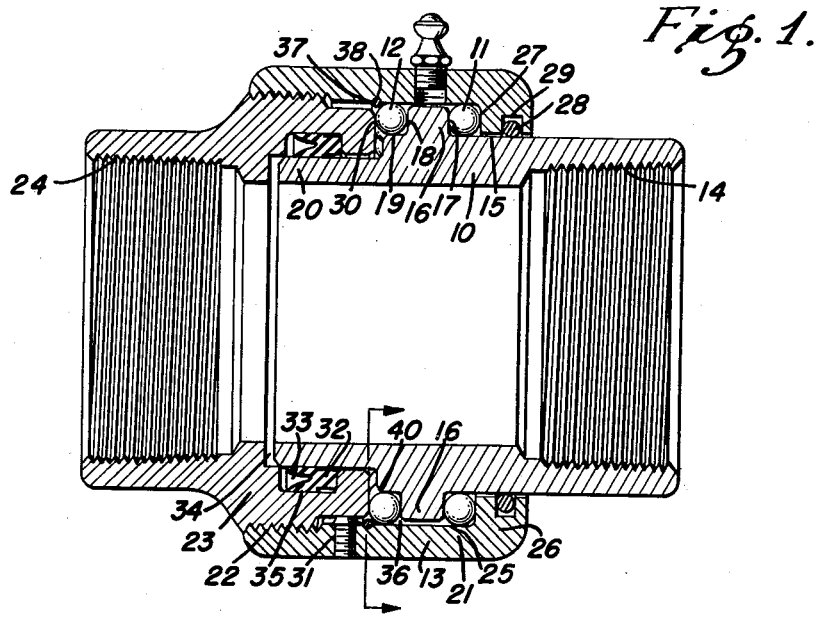
Fig. 1.
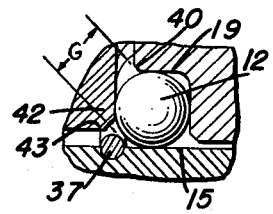
Fig. 3.
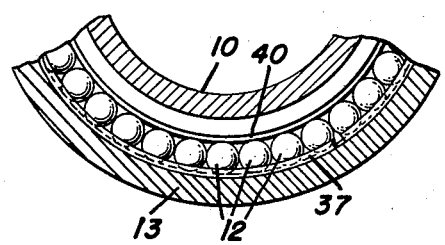
Fig. 2.
William T. Corsette
INVENTOR.
BY 
Attorney

United States Patent Office 2,833,568
Patented May 6, 1958

2,833,568

SWIVEL PIPE FITTING WITH BEARING RETAINER

William T. Corsette, Long Beach, Calif., assignor, by mesne assignments, to The Youngstown Sheet and Tube Company Application February 8, 1954, Serial No. 408,928

1 Claim. (Cl. 285—281)

My invention relates to swivel fittings for connecting pipes or tubes in such a manner that one may be rotated relative to the other and also may be capable of the transmission of fluid under pressure without leakage thereof through the swivel connection.

It is an object of the invention to provide a swivel connection of simple form and economical to manufacture wherein the relatively rotatable swivel parts are supported by spaced rows of ball bearings enabling a free relative rotation of the parts and also maintenance of alignment between the parts.

It is a further object of the invention to provide a swivel connection in which the main, pressure resisting packing is of simple form and easily replaceable.

A further object of the invention is to provide a swivel connection having parts which are separable for the purpose of replacement of the main packing, and having a simple and effective means for retaining the ball bearings in place during the time disconnection of parts is made for the purpose of replacing the main packing.

A further object of the invention is to provide a swivel fitting having an inner tubular part which is supported by two rows of ball bearings within an outer, or shell part, the shell part having at one end thereof a removable bushing, which, when the swivel parts are assembled, lies in overlapping relation to a portion of the inner tubular part of the swivel, there being an annular easily replaceable packing element between the bushing and the extension of the inner tubular member.

Further objects and advantages of the invention may be brought out in the following part of the specification wherein I have explained small details of my invention for the purpose of making a disclosure whereby others may readily practice the invention, without, however, intending to limit the scope of the invention which is defined by the appended claim.

Referring to the accompanying drawing which is for illustrative purposes only:

Fig. 1 is a longitudinal sectional view of a preferred embodiment of my invention;

Fig. 2 is a fragmentary cross section taken as indicated on the line 2—2 of Fig. 1; and Fig. 3 is an enlarged fragmentary sectional view showing the ball-retaining means of the invention.

Referring to Fig. 1, the swivel fitting comprises an inner part 10 supported by rows of ball bearings 11 and 12 in an outer part or shell 13. The inner part 10 is tubular in form and has within its rear ends means, shown as threads 14 for connecting it to a pipe or other fluid conducting or containing member. The inner part 10 has a cylindrical surface 15 lying within the rightward portion of the shell 13. This cylindrical surface 15 is contiguous to a shoulder or rib 16 which projects from an intermediate portion of the tubular member 10. The shoulder 16 has an annular rearward radial face 17 engaged by the leftward portions of the balls 11 when the balls 11 are arranged, as shown in Fig. 1, so as to roll on the portion of the cylindrical surface 15 adjacent the face 17.

The shoulder 16 has a forward annular, radial face 18 and adjacent the radial face 18 the tubular member 10 has a cylindrical face 19 to receive the balls 12. The tubular member 10 also has a cylindrical extension 20 at its front or leftward end.

The shell 13 is tubular and consists of a cylindrical part 21 which is provided at its leftward or front end with internal threads 22, and a bushing or annular connector 23 is screwed into the leftward end of the cylindrical part 21 and has connecting means in the form of threads 24 for connecting it to a fluid conducting member, such as a pipe or fitting. The cylindrical part 21 has therein a cylindrical surface 25, portions of which engage the balls 11 and 12 with a relatively close running fit. The cylindrical part 21 has an inwardly turned flange 26 at its rear end providing an annular radial shoulder 27 to engage the balls 11 on the opposite sides thereof from the radial face 17 of the rib or shoulder 16. Sealing means, shown as a sealing ring 28 contained in an annular groove 29 in the flange 26, is arranged between the flange 26 and the cylindrical surface 15 of the inner tubular part 10 to prevent entry of contaminants into the bearing chamber 36 of the swivel from the exterior.

The rightward end of the connector part 23 extends into the annular recess defined by the front end 20 of the tubular part 10 and the front end of the shell 13. Axial adjustment of pressure applied to the balls 11 and 12 is accomplished by screwing the member 23 into or out of the cylindrical part 21 whereby the distance between the shoulders 27 and 30 may be adjusted to give a proper rolling of the balls 11 and 12 between the inner and outer swivel parts 10 and 13. The member 23 is locked in the shell 21 by set screws, such as shown at 31, and when wear of the bearing means requires adjustment thereof, the set screws 31 may be loosened and the member 23 screwed further into the cylindrical part 21.

Sealing means are provided between the front end 20 of the inner tubular part 10 of the swivel and the removable annular connector part 23. This sealing means comprises a sealing ring 32 contained in an annular groove 33 in the part 23 surrounding a portion of the end 20 of the inner tubular part 10. The sealing ring 32 has a lip 33 which engages the outer surface of the end 20 and is faced toward the annular space 34 between the parts 10 and 23 and communicating with the interior thereof. The sealing ring 32 also has a lip 35 which engages the cylindrical wall of the groove 33. This sealing ring 32 effectively prevents fluid from escaping from the interior of the swivel fitting into the bearing chamber 36 of the swivel, which is ordinarily filled with grease through a grease fitting carried by the cylindrical part 21 of the shell 13.

Replacement of the main packing of the swivel is accomplished without the necessity of removing the inner tubular part 10 of the swivel from the shell 13. The part or bushing 23 is merely unscrewed from the cylindrical part 21 so that the packing ring is carried leftwardly away from the extension 20 of the tubular part 10 to the exterior of the member 21, exposing the inner, ring containing, part of the bushing 23 accessible for ready replacement of the sealing ring 32.

A further important feature of the swivel is that the bushing 23 may be removed from the remaining parts of the swivel connector without danger of losing any of the balls from the operative position in which they are shown in Fig. 1. The means for accomplishing this comprises a ring 37 disposed in an annular groove 38 in the interior surface 25 of the cylindrical part 21, the ring 37 and the groove 38 being positioned adjacent the balls 12 and in spaced relation to the plane defined by the face 18 of the shoulder 16. When the swivel parts are assembled, the ring 37 is in spaced relation to the ball 12, but projects inwardly from the internal cylindrical surface 25 of the cylindrical part 21, so that when the bushing 23 is unscrewed from the cylindrical part 21 the leftward movement of the balls 12 from the positions in which they are shown in Fig. 1 is restricted. The gap G, Fig. 3, between the shoulder 40 at the leftward extremity of the cylindrical surface or ball race 19 and the ring 37 is less than the diameter of the balls 12. The ring 37 is split as shown in Fig. 2 and therefore can be readily installed after placement of the balls 11 and 12 in their operative positions and also can be easily removed should inspection and/or replacement of the balls 11 and 12 be required. The inner end 42 of the bushing 23 is provided with a clearance 43 with relation to the ring 37 so that the ring 37 will not interfere with the adjustment of the bushing to bring the face or shoulder 30 thereof into working relation to the balls 12.

I claim:

In a swivel connection: a tubular part having a front end with an outer cylindrical surface, a rear end for connection to a fluid conducting member, and an external annular rib intermediate the ends thereof, said rib having a forward face and a rearward face; a cylindrical shell surrounding said tubular part, having an inwardly extending flange on its rear end surrounding the rear end of said tubular part and being spaced from said rearward face of said rib, and having its front end surrounding and defining an annular recess around said front end of said tubular part, said front end of said shell having internal screw threads; a rear circle of bearing balls between said rearward face of said rib and said inwardly extending flange of said shell, and engaging the contiguous portions of said tubular part and said shell; a front circle of bearing balls in said recess adjacent said forward face of said rib and engaging the contiguous portions of said tubular part and said shell; a retaining ring secured to the inner face of said front end of said shell, said shell having in the inner face of its front end a groove to receive said retaining ring, said retaining ring engaging the outer portions of the balls of said front circle of bearing balls forwardly of their points of engagement with said shell, for holding said shell in its operative position surrounding said tubular part and retaining said front circle of balls in said recess; an annular connector part having one end for connection to a fluid conducting member and its other end extending into said recess, said other end having external screw threads for engagement with said internal screw threads of said shell and having an end face to engage said front circle of balls, said other end having therein an annular recess facing inwardly toward said cylindrical surface of said front end of said tubular part and said other end of said connector part having a portion of reduced external diameter adjacent said end face thereof so that said retaining ring will not interfere with the adjustment of said connector part into working relation to said front circle of the balls; and a sealing member in said last named annular recess for engagement with said cylindrical surface.

References Cited in the file of this patent

UNITED STATES PATENTS

| | | |
|---|---|---|
| 715,005 | Blair | Dec. 2, 1902 |
| 1,460,154 | Frazier | June 26, 1923 |
| 1,867,296 | Woodruff | July 12, 1932 |
| 2,414,997 | Atkins | Jan. 28, 1947 |
| 2,444,868 | Allen et al. | July 6, 1948 |
| 2,459,981 | Warren | Jan. 25, 1949 |
| 2,509,090 | Faccou | May 23, 1950 |
| 2,532,669 | Jones | Dec. 5, 1950 |
| 2,533,421 | Bodnar | Dec. 12, 1950 |
| 2,655,391 | Atkins | Oct. 13, 1953 |

FOREIGN PATENTS

| | | |
|---|---|---|
| 977,603 | France | Nov. 15, 1950 |